(12) United States Patent
Zhao et al.

(10) Patent No.: US 10,642,035 B2
(45) Date of Patent: May 5, 2020

(54) LASER PROJECTION ARRANGEMENT AND PROCESS FOR THE GENERATION OF VIRTUAL IMAGES

(71) Applicants: Yanning Zhao, Monheim (DE); Elie Abi Chaaya, Jouy le Moutier (FR); Patrick Nebout, Saint-Cloud (FR)

(72) Inventors: Yanning Zhao, Monheim (DE); Elie Abi Chaaya, Jouy le Moutier (FR); Patrick Nebout, Saint-Cloud (FR)

(73) Assignee: Visteon Global Technologies, Inc., Van Buren Township, MI (US)

(*) Notice: Subject to any disclaimer, the term of this patent is extended or adjusted under 35 U.S.C. 154(b) by 0 days.

(21) Appl. No.: 15/626,671

(22) Filed: Jun. 19, 2017

(65) Prior Publication Data

US 2017/0363868 A1     Dec. 21, 2017

(30) Foreign Application Priority Data

Jun. 17, 2016 (DE) .......................... 10 2016 111 119

(51) Int. Cl.
  *G02B 27/01* (2006.01)
  *G03H 1/02* (2006.01)
  *G02B 27/42* (2006.01)

(52) U.S. Cl.
  CPC ..... *G02B 27/0103* (2013.01); *G02B 27/4261* (2013.01); *G03H 1/0248* (2013.01);
  (Continued)

(58) Field of Classification Search
  CPC ........ G02B 27/0103; G02B 2027/0105; G03H 1/0248; G03H 2001/0212;
  (Continued)

(56) References Cited

U.S. PATENT DOCUMENTS 4,981,332 A     1/1991  Smith
2012/0224062 A1  9/2012  Lacoste et al.
(Continued)

FOREIGN PATENT DOCUMENTS

DE    102014224189 A1    6/2016
EP        2731093 A1     5/2014
(Continued)

*Primary Examiner* — Collin X Beatty
*Assistant Examiner* — Grant A Gagnon
(74) *Attorney, Agent, or Firm* — Quinn IP Law

(57) ABSTRACT

The Disclosure concerns a laser projection arrangement and a process for the generation of virtual images, the purpose of which is to present a solution which allows a representation of multiple virtual images in different distances or planes and different points of view and that can be manufactured economically. On the arrangement side, this purpose is solved when one of at least two picture generating units that generate virtual images that differ in their wavelength and/or their polarization is arranged and when a holographic optical element is arranged on or in the projection surface. On the process side, the purpose is solved when two virtual images with different wavelengths and/or different polarizations are generated, when a holographic optical element is provided which exhibits different optical properties for different wavelengths and/or different polarizations, and when, in the case of projection of the virtual images while making use of the holographic optical element, the virtual images are represented, due to the different optical properties, at different distances from the driver and/or in different points of view from the driver.

15 Claims, 5 Drawing Sheets

(52) U.S. Cl.
CPC ............... *G02B 2027/0105* (2013.01); *G02B 2027/0107* (2013.01); *G03H 2001/0212* (2013.01); *G03H 2001/0264* (2013.01); *G03H 2222/12* (2013.01); *G03H 2222/13* (2013.01); *G03H 2260/12* (2013.01)

(58) Field of Classification Search
CPC ....... G03H 2001/0264; G03H 2222/12; G03H 2222/13; G03H 2260/12
USPC .......................................................... 359/3
See application file for complete search history.

(56) References Cited

U.S. PATENT DOCUMENTS

2012/0250306 A1\* 10/2012 Sugiyama .............. B60K 35/00
362/231
2016/0150201 A1 5/2016 Kilcher et al.

FOREIGN PATENT DOCUMENTS

| JP | H06191325 A | 7/1994 |
| JP | 2013127489 A | 6/2013 |

\* cited by examiner

State of the Art

State of the Art

State of the Art

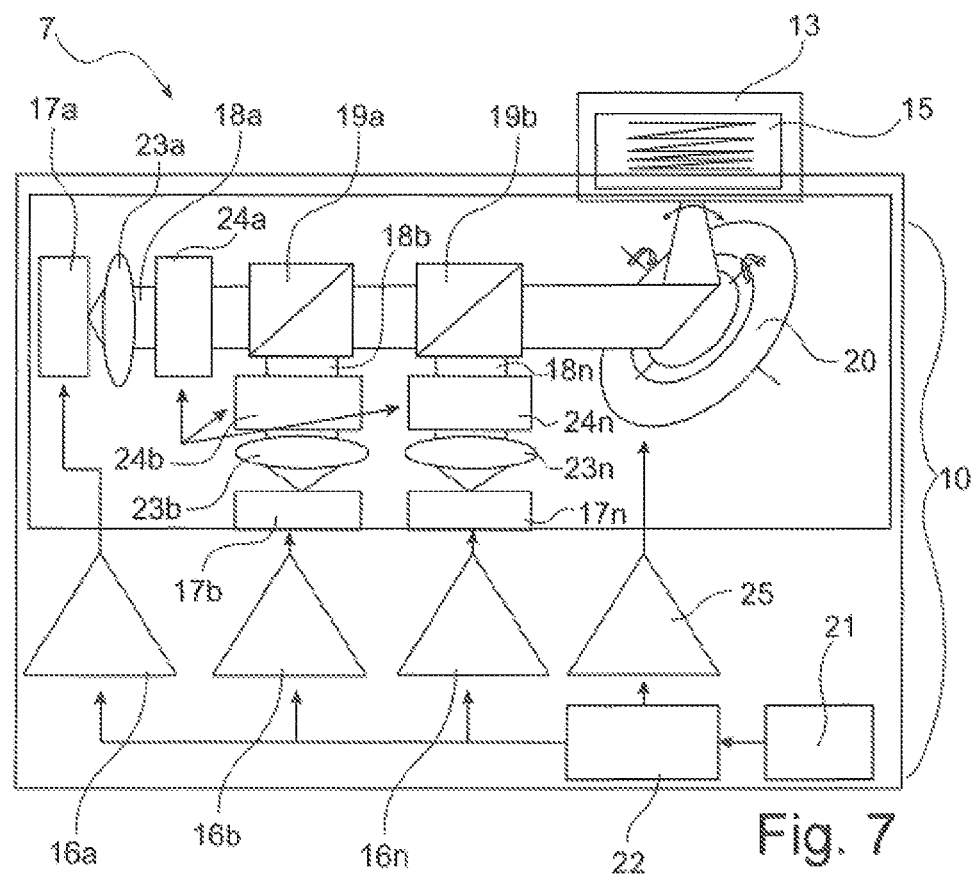
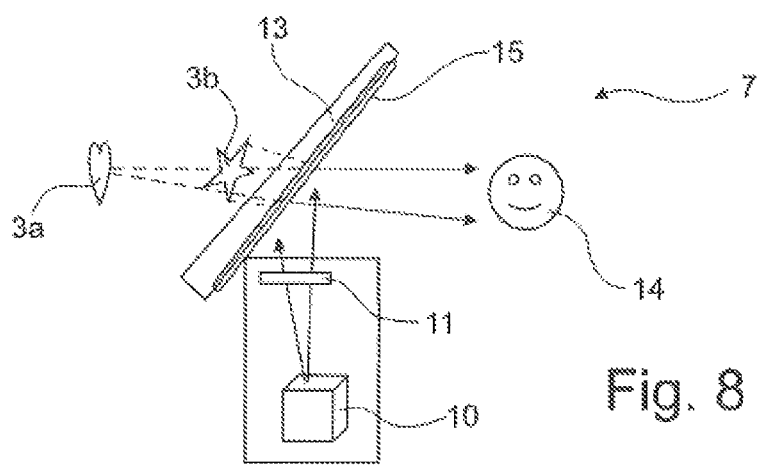
Fig. 7
Fig. 8

LASER PROJECTION ARRANGEMENT AND PROCESS FOR THE GENERATION OF VIRTUAL IMAGES

CROSS-REFERENCE TO RELATED APPLICATION

This application claims priority to German Patent Application No. 10 2016 111 119.8, filed Jun. 17, 2016, and entitled "Laser projection arrangement and process for the generation of virtual images," which is herein incorporated by reference.

BACKGROUND

It is known from the state of the art how to project information in the field of sight of a user, such as, for example, a driver or a pilot, by means of a head-up display. When speaking of a head-up display, which is also abbreviated as HUD, one is to understand a display system wherein the user can essentially maintain the position of the head or alternatively the viewing direction in the original orientation to be able to view the displayed information. Such head-up displays generally feature their own picture generating unit, which provides the information to be represented in the form of an image, an optical module, which permits the beam path through the head-up display to the output opening and which is also referred to as mirror optics, as well as a projection surface, for the display of the image that is to be generated. The optical module guides the image onto the projection surface, which is designed as a reflective, transparent disc and is also referred to as a combiner. In a special case, a windshield that is appropriate for this use is employed as a projection surface. The vehicle driver contemporaneously sees the mirrored information of the picture generating unit and the actual surroundings behind the windshield. The attention of the vehicle driver, for example, when driving a motor vehicle, therefore remains focused on that which is occurring in front of the vehicle, while they are able to grasp the information that is projected in the field of vision.

Among the information to be presented is the display of operational conditions, such as indications relating to speed, engine speed, cargo load, equipment, as well as information from navigation systems, radar systems or homing or sighting systems. Beyond this, for example, in motor vehicles, it is also possible that information relating to currently valid distance limitations, such as prohibition of passing and speed limits, or the setting of adaptive cruise control, abbreviated as ACC, and other things can also be made to be displayed.

The use of a so-called contact analog display, in 2D or 3D perspective, in vehicles is also known. When speaking of contact analog information or display elements, one should understand information or display elements which can be shown in the current view of the vehicle driver that is positionally and directionally correct, in such a way that the vehicle driver is given the impression that this information or display elements are a component of the surroundings of the vehicle. It is thus that the impression is given, for example, that an arrow that is represented, which indicates a change in driving direction or lane change, is directly depicted on the road surface, inasmuch as the pictorial depiction of the arrow has been superimposed on the surroundings perceived by the vehicle driver. This total or partial concealment or superimposition of such positionally and directionally correct overlay information thereby leads to a supplementation of the image that is perceived by the vehicle driver of their surroundings.

Beyond representing a navigation arrow that appears directly on the road, it is also, for example, possible that a distance bar is displayed, which is meant to display the distance to be maintained from the preceding vehicle. It is also possible that a representation of walls and barriers are placed upon existing road markings.

So-called holographic optical elements or components are known from the state of the art, the holographic characteristics of which are used for the optics of devices. Using the same elements exhibiting a hologram, it is possible to replace traditional lenses, mirrors and prisms.

The simplest known holographic-optical component is the so-called Fresnel zone plate, which is also called a zone plate due to its characteristics. A zone plate is the hologram of a point and therefore contemporaneously functions as a transmission hologram as well as a converging lens when the true image is observed, and as a diffusion lens when one starts from the virtual image. Elements of this type have special characteristics, such as, for example, selectivity of color and the angle of incidence of light. It is possible, for example, that the components refract light for a particular angle of incidence, and be completely transparent for another angle of incidence.

Designs of the holographic-optical elements with varying diffraction of the light, dependent on its wavelength, allow for a break down in colors of the spectrum, in the same way as with a prism.

There are solutions that are known, whereby planar mirrors, concave mirrors or convex mirrors are produced with the help of reflection holograms, which are able to reflect light in such a way that the angle of incidence differs from that of the angle of reflection. Elements of this type are, for example, employed to guide daylight towards a photovoltaic system or into the interior of a space.

A display device, a vehicle with a display device, and a computer program product for a display device, are known from DE 102014000487 A1. This display device comprises at least a first concave mirror and a second concave mirror, whereby the second concave mirror exhibits at least one opening, a convex cavity that spans both concave mirrors, a diffracting optical element that is arranged in the cavity with a multitude of optical phase modulation cells, whereby the diffractive optical element provides a hologram. On top of this, at least one light source to illuminate the phase modulation cells of the diffractive optical element and a transparent touchpad, that covers the at least one opening and foresees an input of data, whereby the diffractive optical element is arranged in the cavity in such a way that the beam that exits the at least one light source is modulated by the phase modulation cells, passes through the opening and reproducing a holographic image on top of the transparent touchpad within a defined field of vision, by means of the transparent touchpad.

A holographic screen is known from DE 19730563 A1, which appears black, grey or colored in ambient light and primarily finds use in a motor vehicle. It is disclosed that the screen is arranged on a slightly angled surface of the roof liner in the middle to front area of the vehicle. After the at least one projection system has been switched on, the screen is illuminated either by laser scanning or flatly by means of an appropriate light source, such as, for example, a halogen light. The laser thereby gets modulated according to the desired or required image information or the flat projection overlays the image content by means of light valves such as slides or a transparent small LCD screen. It is possible to use three colors (RGB) (red, green and blue) for a full color representation.

In the event in which the modulated projection beam was to reach the screen as a black projection surface, from the point of view of the viewer, a clear, high-contrast image results at a viewing distance that doesn't necessarily need to be identical to the plane of the projection surface. This viewing distance can therefore also be represented at a greater distance from the eye, whereby the accommodation of the eye can be facilitated. It is furthermore possible to realize a three-dimensional representation.

Using a known head-up display (HUD), it is possible to generate a virtual image in a plane with a determined distance to the viewer. In the case of need for a representation of two or multiple virtual images, which are to be represented at varying distances or planes, it is necessary to employ two or more picture generating units. The problem with such a solution is a greatly increased need not only in the installation space required in the vehicle in the dashboard area, but also in the costs of two separate picture generating units.

SUMMARY

The disclosure concerns a laser projection arrangement for the generation of virtual images, comprising a picture generating unit, an optical module and a projection surface, whereby the picture generating unit features at least one laser source and one means for the generation of an image that is to be displayed.

The disclosure also concerns a process for the generation of virtual images with a laser projection arrangement, through which a virtual image is generated by means of a picture generating unit and depicted for a driver, making use of a projection surface.

The purpose of the disclosure consists in providing a laser projection arrangement as a picture generating unit and a process for the generation of virtual images, whereby a representation of multiple virtual images in various distances or planes and various points of view is made possible and which is inexpensive to produce.

The purpose is achieved by an object having the features according to Patent Claim 1 of the independent patent claims. Further developments are indicated in the dependent Patent Claims 2 through 8.

It is foreseen that the picture generating unit of the laser projection arrangement is designed in such a manner that the possibility of generating at least two virtual images is achieved, whereby the virtual images that are generated differ from one another through the wave length $\lambda$ of the laser light that is used for the generation of the virtual images, which are provided by means of a corresponding laser source.

As an alternative, it is foreseen that the generation of the at least two virtual images will occur in such a manner that the virtual images differ due to the phase position $\varphi$ of the laser light used for generation. For this purpose, a means of polarization is arranged for every laser source of the picture generating unit, through which a corresponding control signal can be operated in multiple polarization approaches and can thereby generate light with varying polarization.

A holographic optical element (HOE) is furthermore foreseen, which is applied on a surface of the projection surface or integrated into the projection surface. In a particular embodiment, the holographic optical element is laminated into the windshield of a vehicle.

This holographic optical element exhibits, for example, different optical properties for determined different frequency bands. This is achieved by keeping the element provided as a volume hologram, in which its optical properties are only permanently registered once as a hologram which can resemble a mirror or a lens.

In the event in which a first virtual image that was generated with a first wavelength $\lambda 1$ of the laser source focuses on the holographic optical element, which exhibits varying optical properties for varying wavelengths, then the first virtual image will be illustrated at a first distance and from a first angle of vision, from the driver's point of view. An angle of vision of this type comprises both a horizontal as well as a vertical component.

In the event in which a second virtual image that was generated with a second wavelength $\lambda 2$ of the laser source on the holographic optical element, then the second virtual image will be illustrated at a second distance and from a second angle of vision, from the driver's point of view. In this, the first distance is different from the second distance. It is thus that, for example, the first virtual image can be illustrated at a distance of 2 meters from the driver, hovering over the hood, and the second virtual image at a distance of 30 meters from the driver, apparently focused on the road surface.

It is foreseen in a further embodiment of the disclosure that two virtual images with two different phase positions $\varphi 1$ and $\varphi 2$ are provided by the picture generating unit. In this case, the holographic optical element is provided in such a manner that different optical properties are exhibited for these different phase positions $\varphi 1$ and $\varphi 2$. The first virtual image with its first phase position $\varphi 1$ is thereby projected at another distance and from another point of view than the second virtual image with its second phase position $\varphi 2$.

Since the holographic optical element only exhibits special optical properties in the selected narrow banded wavelength ranges, it otherwise appears as a transparent layer. It can thus, for example, be applied on a windshield of a vehicle without impacting the view of the driver of the roadway and the surroundings.

It is foreseen that the holographic optical element, together with the windshield, forms a projection surface that is needed for a laser projection arrangement.

The holographic optical element is, for example, affixed on one surface of the windshield or optically bonded to it. Alternatively, the element can be laminated into the windshield. Processes known from the state of the art can be used for this purpose.

A photopolymer is foreseen as the material for the holographic optical element.

The holographic structure that is inserted into the holographic optical element can be introduced, for example, by means of a laser.

A number of laser sources, with varying wavelengths $\lambda$, or means of polarization are to be arranged in the picture generating unit, based upon the number of different virtual images that are to be represented. For three virtual images, three laser sources with differing wavelengths $\lambda 1$, $\lambda 2$ and $\lambda 3$ or means for polarization, which exhibit three polarization settings, are required.

The purpose is achieved through a process with the features according to patent Claim 9 of the independent patent Claims. Further developments are shown in the dependent patent Claims 10 through 12.

At least two virtual images, with differing wavelengths and/or different polarization are generated in the picture generating unit. Furthermore, a holographic optical element is prepared, which exhibits different optical properties for different wavelengths λ and/or different polarizations. When the virtual images that are generated with varying wavelengths λ or different polarizations are projected on the projection surface with the holographic optical element, the virtual images are represented at different distance from the driver and/or in different points of view from the driver, depending on the different optical properties of the holographic optical element.

In this manner the current speed can be projected for the driver in a floating manner over the hood and a contact analog navigation instruction over the roadway. In so doing, the distance for the first virtual image is at approximately 2 meters and that of the second virtual image at approximately 20 meters. Whereas the first virtual image is projected almost straight ahead with a small angle downwards from the driver, the second virtual image, which is meant to represent a notice to turn right from the right lane, is projected with a larger downward angle and moved towards the right, which is to say from a point of view that differs from the first point of view.

BRIEF DESCRIPTION OF THE DRAWINGS

Further details, features and advantages of embodiments of the disclosure result form the following description of embodiments with reference to the corresponding Figures. These show:

FIG. 8: a further exemplary representation of virtual images when using the laser projection arrangement from FIG. 7, FIG. 9: an illustration with projected virtual images, which are recognized by a viewer out of varying positions in a variant with spaced virtual images

DETAILED DESCRIPTION

Figure 1:
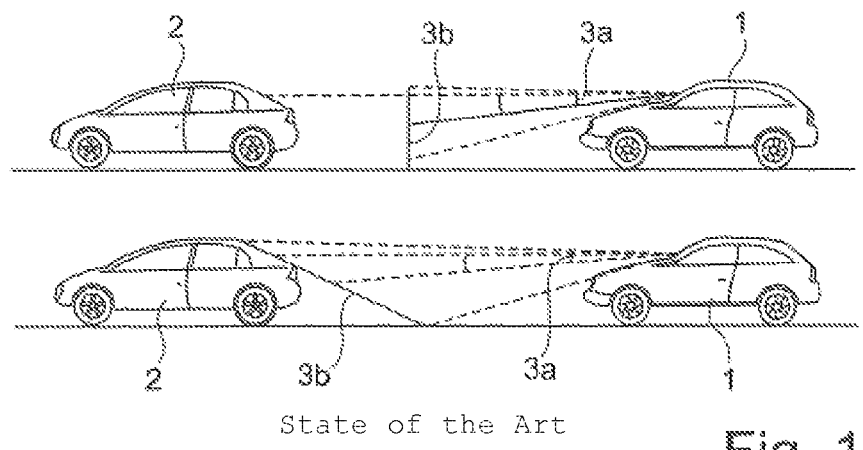
FIG. 1: a schematic diagram of the provision of information for a motor vehicle driver by means of a laser projection arrangement according to the state of the art.

A possibility for the provision of information for a motor vehicle driver 14 by means of a laser projection arrangement 7 according to the state of the art is shown in FIG. 1. A first vehicle 1, as well as a second vehicle 2 that is preceding the first vehicle 1, are represented. The first vehicle 1 is fitted with a laser projection arrangement 7 (HUD), by means of which information in the form of a virtual image 3 can be projected to the driver 14 of the first vehicle 1, in their visual field. In this, the virtual image 3 can consist of marks, such as, for example, characters and numbers, or symbols, such as, for example, traffic signs, lines or arrows. The laser projection arrangement 7 is not represented in FIG. 1.

In the upper partial representation, FIG. 1 shows a projection of a first visual image 3a in a first plane, which is also identified as a projection plane, at a distance of approximately 2 meters in front of the driver 14, who perceives this first virtual image 3a in a floating manner on top of, or, shortly in front of the hood. As an example for this first virtual image 3a, it is possible to display the current vehicle speed.

Alternatively, it is possible to generate a second virtual image 3b, through the laser projection arrangement 7, in a second plane, which is represented vertically in the upper partial representation, approximately in the middle of the two vehicles 1 and 2, in an area that is, for example, 10, 15 or 20 meters in front of the driver 14. This second virtual image 3b can, for example, provide navigation information for the driver 14.

The scene described here above is represented in the lower partial representation of FIG. 1, whereby, in this case, the second virtual image 3b is projected in a projection plane at an oblique angle to the roadway. In this case, the second virtual image 3b appears to the driver 14 to be virtually on the road. This adaptation can lead to a pleasing perception of the superimposition of information about the surroundings in the roadway in front of the vehicle and the inserted virtual representations.

A contact analog representation of virtual images can be realized in a projection plane with an angle of this type, or with a flatter angle.

Figure 2:
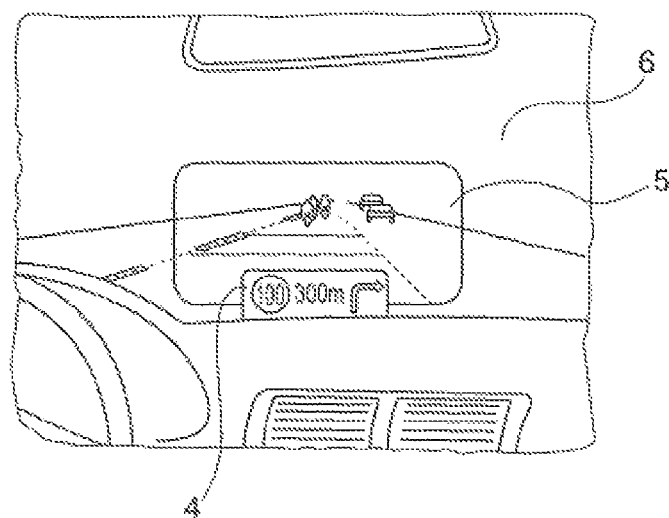
FIG. 2: an exemplary representation of the information that is provided by means of laser projection arrangement according to the state of the art.

A detail of the windshield 13 of a vehicle 1 from the sight of a driver 14 can be seen in FIG. 2 with three different representation areas 4, 5 and 6.

For example, in a first representation area 4, information about current and/or maximum permissible speed and/or navigation information is displayed. This first representation area 4 corresponds to a classical laser projection arrangement (HUD), which features a projection surface (combiner) belonging to the HUD above the dashboard, for the representation of a virtual image. Alternatively, this projection surface can also be designed as a portion of the windshield 13. This first representation area 4 is most frequently limited by the size of the projection surface.

The second representation area 5, which is larger than the first representation area 4, is generally used for contact analog representations, upon which information is superimposed in a positionally and directionally correct manner in the current sight of the vehicle driver 14 and appear to the vehicle driver 14 as a component of the environment of the vehicle 1. This overlay of the surroundings with virtual information can, for example, include navigation information, or, display a distance to be maintained behind the preceding vehicle 2. Additionally, it is naturally also possible to represent information relating to speed, warning indications and other.

The third representation area 6 encompasses an area that is even larger than the second representation area 5 and can also encompass the whole windshield 13 in a special embodiment. Navigation information or any other information can be represented in this area. This could, for example, also be information relating to a vehicle system or about information drawn from the surroundings such as data relating to the next destination or about a possible parking opportunity.

Whereas the first or second representation areas 4 and 5 are used for the representation of information using a laser projection arrangement 7 that is known from the state of the art, the use of the third representation area 6 is either not or only limitedly possible with devices of said type. Furthermore, when using known laser projection arrangements 7, either the first or the second representation area 4 or 5 are alternatively addressed. A use of both of the representation areas 4 and 5 by means of a known laser projection arrangement 7 is not possible. Insofar as a separate laser projection arrangement 7 is necessary for each representation area, the space requirements as well as the costs for this type of solution are very great.

Figure 3:
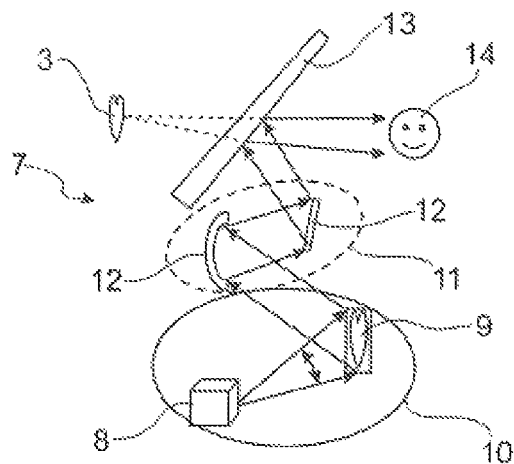
FIG. 3: a schematic representation of a laser projection arrangement according to the state of the art.

In FIG. 3 there is a schematic representation of a laser projection arrangement 7 from the state of the art. The laser projection arrangement 7 comprises a light source 8, which in a special design of a laser projection arrangement 7 can be a laser source 17, as well as an instrument 9 for the generation of the image that is to be represented.

This instrument 9 for the generation of the image that is to be represented can be designed in the form of the display, upon which the image to be represented is generated. This display can be illuminated from within or externally by means of a light beam generated by the light source 8. Alternatively, the image to be represented can be present in the instrument 9 in digital form and can be generated by the impression of the image information on the light beam generated by the light source 8 as well as a corresponding deviation of the beam in an X-direction and a Y-direction, for example, by means of an appropriate rotating mirror. In this, the representation of the image to be generated follows the cathode ray tube principle, according to which the beam writes the image on a line-by-line basis on a projection surface. The manner and method of the generation of the image to be represented with the instrument 9 is only shown in an exemplary manner here, insofar as the same does not have any appreciable impact on this disclosure.

The light source 8 and the instrument 9 for the generation of the image to be represented are generally referred to as a picture generating unit 10 or PGU.

The image generated by the picture generating unit 10 is deviated in such a manner in the laser projection arrangement 7, for example, by means of an optical module 11, which is also referred to as a so-called mirror system and which, for example, comprises a first and a second mirror 12, that the deviated light beam strikes a determined area of a projection surface, such as for example, a windshield 13. This determined area is preferably selected so that it lies in the field of vision of a viewer or driver 14 of a motor vehicle 1.

With the virtual image 3 projected in this manner in the field of vision, the driver 14 perceives it together with the current traffic occurrences. Insofar as the virtual image 3, as shown in FIG. 3, is displayed at a distance in front of the windshield 13, it appears to the driver 14 as if it were melded into the current traffic occurrences. In the example of FIG. 3, the mirror 12 is designed having a concave shape. It is possible through this concave design, as well as eventually also through lenses that are fitted in the path of the beam, which are not shown, to carry out an adaptation of the virtual image that is to be generated as regards its size, shape and the position of its appearance.

Figure 4:
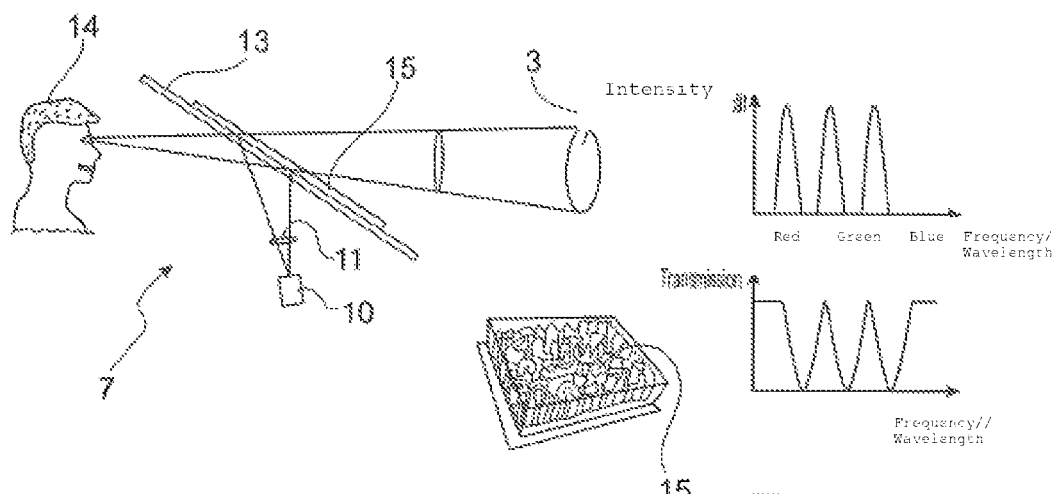
FIG. 4: a representation of the holographic optical element with its properties and its installation location.

A laser projection arrangement 7 according to the disclosure is shown in a schematic diagram in FIG. 4. A picture generating unit 10 with an optical module 11 and a projection surface, which is generated by the windshield 13, are arranged for the generation of a virtual image 3. So as to be able to generate a virtual image 3 in various positions and distances in all three representation areas 4, 5 and 6 by means of an appropriate modification of the laser projection arrangement 7, a holographic optical element 15 (HOE) is furthermore foreseen. This holographic optical element 15 is applied at least on a portion of the surface of the windshield 13. In an alternative execution it is foreseen that the holographic optical element 15 is laminated into the windshield 13 in the form of a plane or a layer.

This holographic optical element 15 is, for example, provided in such a manner that it corresponds to a volume hologram, which for example, is optically registered in photopolymer material. The holographic optical element 15 is designed in such a manner that it provides two or more different optical lenses or mirror functions for two or more respectively selected frequency bands with a determined band width. Alternatively, it is possible that two or more different polarizations for pre-determined frequency widths of the laser light or the laser light source are provided by means of the holographic optical element 15.

In as much as the holographic optical element 15 demonstrates a higher transparency for light frequencies that lie outside of the selected frequency bands, it can be integrated into or superimposed on the field of vision of the driver 14, on or in the windshield 13, in a large or entire area of the windshield 13, without qualitatively limiting or disturbing the sight of the driver 14. The windshield 13, together with the holographic optical element 15, make up the projection surface for the laser projection arrangement 7 according to the disclosure.

A representation of the main structure of the holographic optical element 15 is, in part, illustrated in the lower portion of the middle of FIG. 4. The exemplary structure that is shown, which can be introduced into the material (photopolymer material) by means of a laser, provides the function of a lens or a mirror, whereby this function is dependent on the frequency and/or polarization of the impacting light, in particular of the impacting laser light.

A graphic representation of the dependence of the intensity of a frequency or wavelength, as well as a dependence of a transmission, which is to say a permeability of a medium for waves, such as, for example, electromagnetic waves is depicted in the right portion of FIG. 4. In the example, the electromagnetic waves in the area of the visible lights are indicated with the colors red, green and blue. The lower diagram shows that in the areas of the red, green and blue, the permeability of the holographic optical element 15 is reduced in a narrow-banded manner, which permits a representation of a virtual image 3 for the driver 14. The transmission does not get influenced in the other frequency regions, whereby the perception of the surroundings in front of the vehicle 1 by the driver 14 is not impacted.

Figure 5:
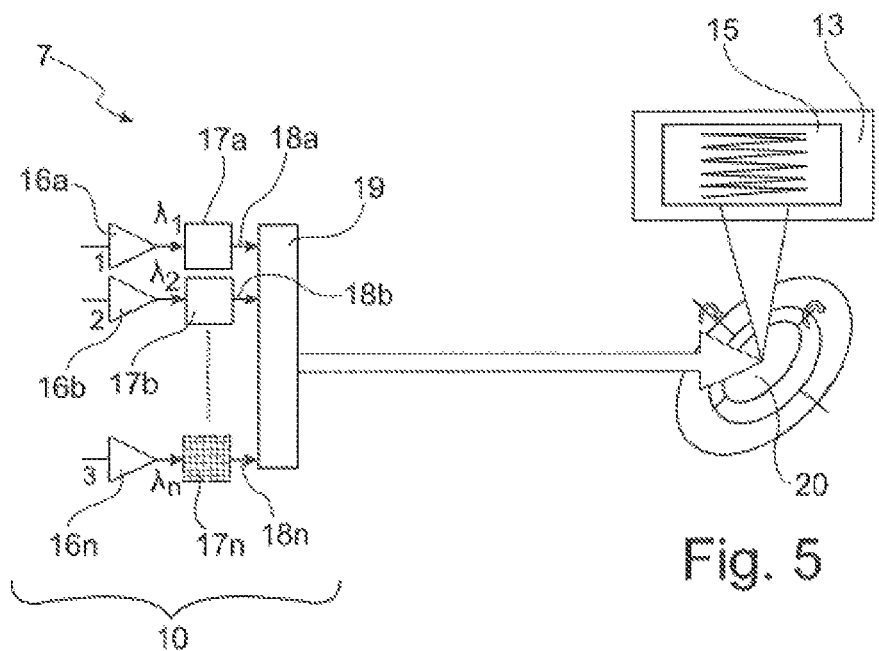
FIG. 5: a first realization of the laser projection arrangement according to the disclosure by means of multiple lasers, which exhibit different wavelengths.

In FIG. 5, a first realization is shown of the laser projection arrangement 7 according to the disclosure, by means of multiple lasers, which exhibit different wavelengths $\lambda 1$, $\lambda 2 \ldots \lambda n$. This laser projection arrangement 7, in particular its picture generating unit 10, can feature multiple drivers 16 for the control of multiple laser sources 17. It is foreseen that a first driver 16a controls a first laser source 17a, for the generation of a first laser beam 18a with a first wavelength $\lambda 1$. It is furthermore foreseen that a second driver 16b controls, and so forth, a second laser source 17b, for the generation of a second laser beam 18b with a second wavelength $\lambda 2$.

Each of these generated laser beams 18a, 18b through 18n can provide its own modulated image content through a corresponding control of the respective driver 16a, 16b through 16n.

The laser beams 18a, 18b through 18n that are generated in this manner are brought together or superimposed in a downstream combination optic 19. The mixture of the amalgamated laser beams 18a, 18b through 18n is projected through a rotating mirror 20, which allows for a deviation of the beam in an X-direction and in a Y-direction, on a projection surface such as windshield 13. A rotating mirror of this type 20 can, for example, be realized by means of a micro-electro-mechanical system (MEMS).

The holographic optical element 15 arranged on or in the windshield 13 exhibits different optical properties for different wavelengths $\lambda 1, \lambda 2 \ldots \lambda n$. It is thereby possible to separate the image content of the partial images that correspond to the different wavelengths $\lambda 1, \lambda 2 \ldots \lambda n$ once the holographic optical element 15 is struck and to present it in different image planes. As a consequence, virtual images 3a, 3b through 3n can be represented to the driver 14 in different positions and/or in differing distances within their field of vision. The different virtual images 3a, 3b through 3n are not shown in FIG. 5.

It is thereby possible that, for example, in the first representation area 4 the current speed is displayed at a distance of approximately 2 meters to the driver 14, in the second representation area 5 a navigation instruction for a change of lane at the forthcoming turn-off in the form of a contact analog representation at a distance of approximately 20 meters, and in the third representation area 6 an indication of a dangerous point that lies in the direction of travel, where an accident has occurred, at a distance of approximately 50 meters.

Figure 6:
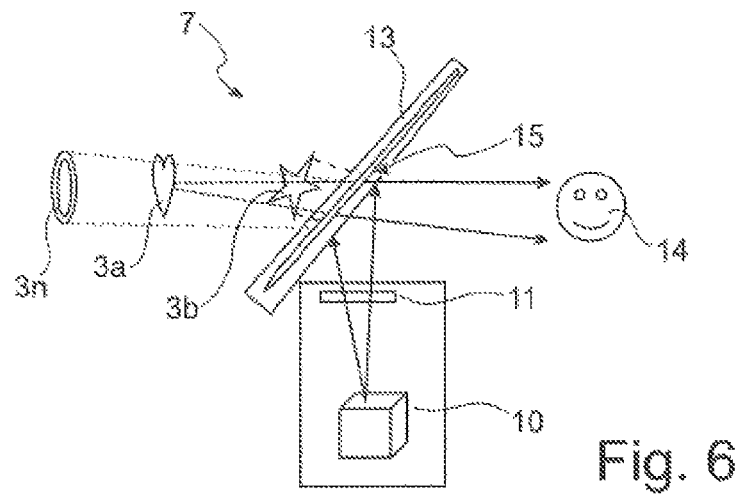
FIG. 6: an exemplary representation of virtual images when using the laser projection arrangement from FIG. 5, FIG. 7: a second realization of the laser projection arrangement according to the disclosure when using multiple lasers and employing a polarization.

The generation of multiple virtual images 3 making use of the laser projection arrangement 7 from the FIG. 5 is shown in the FIG. 6. As described above, this laser projection arrangement 7 generates multiple partial images making use of laser sources with different wavelengths $\lambda 1, \lambda 2 \ldots \lambda n$ in the picture generating unit 10. Following projection of the mixture of the amalgamated laser beams 18a, 18b through 18n, by means of the optical module 11 and making use of a rotating mirror 20 on the holographic optical element 15, which is shown in FIG. 6 integrated in the windshield 13, the virtual image 3a, 3b and 3n are projected, for example, as shown in FIG. 6, at various distances to the driver 14 and eventually in different points of view of the driver 14 within their field of vision.

In the example, the second virtual image 3b, which was generated making use of the laser source 17b with the corresponding wavelength $\lambda 2$ and represented as a star, is next projected to the driver 14. Thereafter follows, as regards distance, the first virtual image 3a, generated by means of the laser source 17a with wavelength $\lambda 1$, which appears in the shape of a heart. The $n^{th}$ virtual image 3n, which is generated by means of the laser source 17n with the wavelength $\lambda n$, is represented the furthest away from the driver 14, and is shown with a ring. The virtual images 3 that are represented solely serve the purpose of clarification of the disclosure and do not limit the disclosure, for example, to the exemplary forms that have been chosen.

A second exemplary realization of the laser projection arrangement 7 according to the disclosure, that makes use of multiple laser sources 17 while using a polarization, is shown in FIG. 7. An image generating control 21 provides the virtual image 3 to be generated in the picture generating unit 10 of the laser projection arrangement 7 according to the disclosure and is linked with a control unit 22.

The control unit 22 controls at least the drivers 16a, 16b and 16n, which are each linked on the output side with a laser source 17a, 17b and 17n. The control unit 22 is furthermore linked with a rotating mirror control 25, which generates electrical control signals which are needed for the corresponding deviation of the overall laser beam by means of the rotating mirror 20.

The laser sources 17 of the picture generating unit 10 can be split in such a manner that the first laser source 17a generates laser light in the green wavelength range, the second laser source 17b laser light in the blue wavelength range and the third laser source 17n light in the red wavelength range of the visible light. A collimator 23a, 23b and 23n is arranged after each laser source 17 for the generation of a parallel beam path of the light generated by the respective laser sources 17a, 17b and 17n. It is, for example, possible to employ laser diodes with wavelengths corresponding to the generated light as the laser sources 17a, 17b and 17n.

A controllable means of polarization 24a, 24b and 24n is placed downstream of each of the collimators 23a, 23b and 23n. This means of polarization 24a, 24b and 24n can be operated in multiple polarization settings by a control that is not depicted and in this manner generate the polarized laser beams 18a, 18b and 18n which are amalgamated into a mixture of the united, polarized laser beams 18a, 18b through 18n by means of a combination optic 19a and 19b. This mixture is deviated by means of a rotating mirror 20 that is controlled by the rotating mirror control 25 in an X-direction and a Y-direction, and in this manner strikes upon the holographic optical element 15.

In the case of this embodiment, the holographic optical element 15 is provided in such a manner that it exhibits different optical properties for different polarizations of the striking laser light deviated by the rotating mirror 20. A first virtual image 3a that is generated when using a first polarization setting therefore appears at a different distance and/or in another point of view than a second visual image 3b that is generated when using a second polarization setting.

A further exemplary representation for the generation of multiple virtual images 3 while making use of the laser projection arrangement 7 from FIG. 7 is depicted in FIG. 8. The laser projection arrangement 7, with the aid of the holographic optical element 15, as described above, generates multiple partial images while making use of multiple laser sources 17a, 17b and 17n, while using multiple means of polarization 24a, 24b and 24n, by means of the picture generating unit 10.

Following the projection of the mixture of the amalgamated laser beams 18a, 18b through 18n while using a rotating mirror 20 on the holographic optical element 15, which is represented in FIG. 8 applied on the surface of the windshield 13 that is turned towards the driver 14, the virtual images 3a and 3b, as shown in an exemplary manner in FIG. 8, are projected at different distances to the driver 14 and eventually in different points of view of the driver 14, within their field of vision.

In the example shown, the first virtual image 3a, which was generated making use of a first polarization setting for the means of polarization 24a, 24b and 24n and represented as a heart, is projected at the greater distance to the driver 14. The second virtual image 3b, which is generated by means of a second polarization setting for the means of polarization 24a, 24b and 24n of the arrangement according to FIG. 7, which appears in star-shape, appears to be closer to the driver 14.

Since the holographic optical element 15, that is arranged on the windshield 13, exhibits different optical properties for different polarizations or polarization settings, it becomes possible to break down the image contents, which were generated with different polarization settings for the means of polarization, in multiple virtual images 3a and 3b upon the striking of the holographic optical element 15, which appear projected on different image planes.

Figure 9:
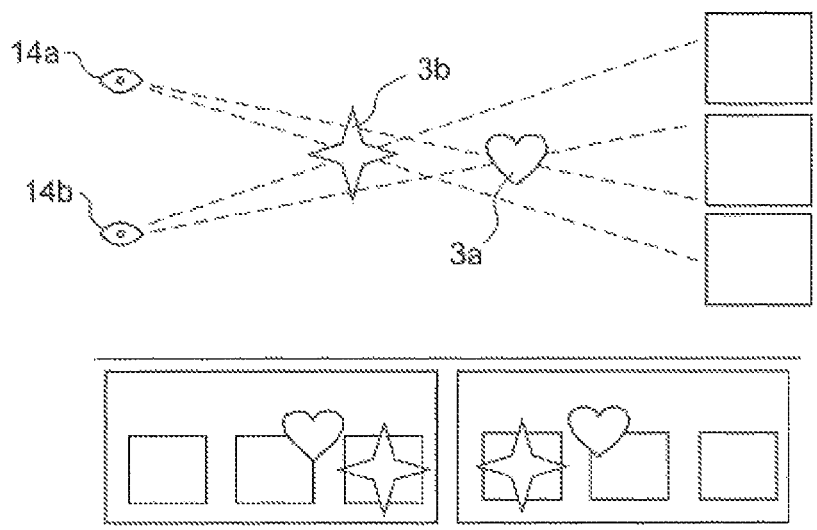
Figure 10:
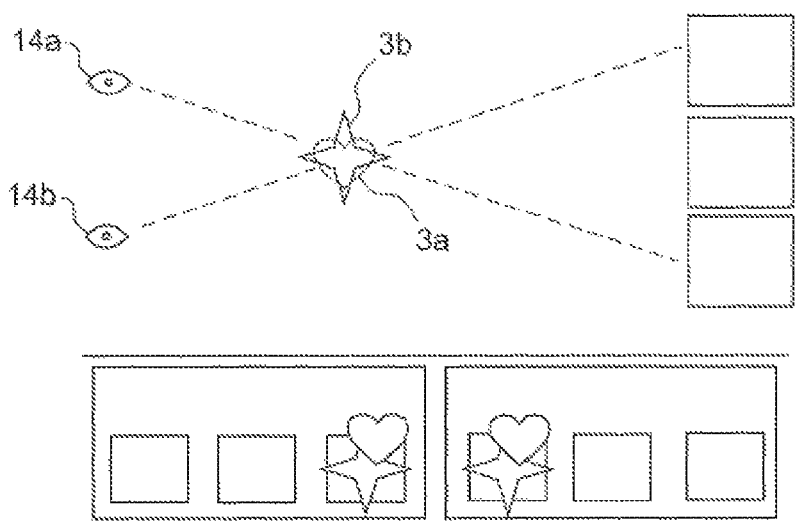
FIG. 10: a second illustration with projected virtual images, which are recognized by a viewer from varying positions in a variant with virtual images without spacing.

There are respectively two virtual images 3a and 3b which are projected in FIGS. 9 and 10, which are viewed by a viewer or driver 14 from a first and a second position with corresponding background areas. In the lower portion of the FIGS. 9 and 10, one furthermore respectively finds a representation of the two virtual images 3a and 3b in front of the respective background as they are to be recognized by the driver 14 in the first and in the second position.

It should be recognized that in the case of a projection of the virtual images 3a and 3b at different distances or in different image planes to the driver 14, a realistic representation is enabled, in which the representation that is to be recognized changes dependent on the position for the driver 14.

In the representation of FIG. 10, in which the virtual images 3a and 3b are not projected in different distances or planes, only the same representation can be perceived by the driver 14 in each position.

We claim:

1. A laser projection device for generating virtual images for a driver of a vehicle, the laser projection device comprising:
   a picture generating unit having a first laser source and a second laser source, wherein the picture generating unit is operable to simultaneously generate a first image having a first wavelength and a first polarization with the first laser source, and a second image having a second wavelength and a second polarization with the second laser source;
   a combination optic disposed downstream of the picture generating unit and operable to combine the first image from the first laser source and the second image from the second laser source into a single light beam;
   a projection surface having a holographic optical element disposed downstream of the combination optic, wherein the holographic optical element exhibits a first optical property for the first wavelength or the first polarization, and a second optical property for the second wavelength or the second polarization; and
   wherein the first optical property and the second optical property simultaneously separate the single light beam into a first image projection on a first projection plane and a second image projection on a second projection plane respectively, wherein the second projection plane is farther than the first projection plane relative to the driver so that the second image projection appears farther from the driver than the first image projection.

2. Laser projection device according to claim 1, wherein the holographic optical element comprises a photopolymer as a volume hologram carrier.

3. Laser projection device according to claim 1, further comprising a holographic structure applied to the holographic optical element.

4. Laser projection device according to claim 1, further comprising at least two controllable devices arranged in the picture generating unit, the at least two controllable devices being operable in multiple polarization settings to polarize the first image and the second image respectively.

5. The laser projection device according to claim 1, further comprising a rotating mirror disposed between the combination optic and the projection surface and moveable in both an x-direction and a y-direction, and operable to direct the single light beam onto the projection surface.

6. The laser projection device according to claim 1, wherein the picture generating unit includes a first driver in communication with the first laser source and operable to control the first laser source to generate the first image, and a second driver in communication with the second laser source and operable to control the second laser source to generate the second image.

7. The laser projection device according to claim 1, wherein the projection surface is a windshield.

8. Laser projection device according to claim 7, wherein the holographic optical element is applied on a surface of the windshield.

9. Laser projection device according to claim 7, wherein the holographic optical element is integrated in a two-dimensional manner on the windshield.

10. The laser projection device according to claim 1, wherein the first projection plane is arranged in a vertical orientation relative to the driver.

11. The laser projection device according to claim 10, wherein the second projection plane is arranged at an oblique angle relative to a roadway so that the second image projection appears to lie on the roadway relative to the driver.

12. A method of generating multiple virtual images simultaneously, the method comprising:
   simultaneously generating a first image having a first wavelength and a first polarization from a first laser source and a second image having a second wavelength and a second polarization from a second laser source;
   combining the first image and the second image into a single light beam with a combination optic;
   redirecting the single light beam onto a projection surface with a rotating mirror, wherein the projection surface includes a holographic optical element exhibiting a first optical property for the first wavelength or the first polarization, and a second optical property for the second wavelength or the second polarization;
   separating the single light beam into a first image projection on a first projection plane and a second image projection on a second projection plane respectively with the holographic optical element, wherein the second projection plane is farther from the first projection plane relative to a viewer of the projection surface so that the second image projection appears farther from the viewer than the first image projection.

13. The method according to claim 12, wherein the holographic optical element is provided as a volume hologram carrier with a firmly introduced holographic structure.

14. The method according to claim 12, wherein the holographic optical element exhibits a diminished transparency for one or multiple determined wavelength ranges.

15. The method according to claim 12, wherein the holographic optical element is disposed on a windshield of a vehicle.

* * * * *